United States Patent

[11] 3,611,043

| [72] | Inventor | Floyd L. Steen<br>Lansdowne, Pa. |
|---|---|---|
| [21] | Appl. No. | 55,334 |
| [22] | Filed | July 16, 1970 |
| [45] | Patented | Oct. 5, 1971 |
| [73] | Assignee | General Electric Company |

[54] PROTECTIVE CIRCUIT FOR STATIC SWITCH
3 Claims, 2 Drawing Figs.

[52] U.S. Cl. .................................................. 317/33 SC,
317/43, 321/13, 323/9
[51] Int. Cl. .................................................. H02h 7/14
[50] Field of Search .......................................... 321/12, 13;
317/33 SC, 43; 323/9

[56] References Cited
UNITED STATES PATENTS

| 2,672,584 | 3/1954 | Rolf | 321/12 |
| 2,693,566 | 11/1954 | Hooper | 321/12 |
| 3,110,856 | 11/1963 | Albert | 321/13 X |
| 3,558,983 | 1/1971 | Steen | 317/33 SC |

Primary Examiner—James D. Trammell
Attorneys—J. Wesley Haubner, Barry A. Stein, Frank L. Neuhauser, Joseph B. Forman and Oscar B. Waddell ABSTRACT: Disclosed is a protective circuit adapted for utilization in a power system including a thyristor switch which is intended selectively to permit or block the flow of electric current from a power source to a load. A backup circuit breaker is provided in the system in series with the thyristor switch. The protective circuit includes logic means adapted for causing the backup circuit breaker to interrupt in the abnormal event that the thyristor switch becomes disabled.

INVENTOR:
FLOYD L. STEEN,
BY Barry A. Stein
ATTORNEY

PROTECTIVE CIRCUIT FOR STATIC SWITCH

BACKGROUND AND OBJECTS OF THE INVENTION

This invention relates to electric power-switching apparatus and to protective means therefor, and more particularly it relates to a combination of a solid state (thyristor) switch which is intended selectively to permit or to block the flow of electric current between a source and a load and means for isolating the load from the source in the abnormal event the thyristor switch becomes disabled.

In the art of electric power distribution and utilization, it is a common practice to employ switches or circuit breakers in order to initiate or terminate the flow of load current on command. These switches may advantageously be constructed of solid-state controllable switching devices such as thyristors. Since such switches do not utilize any moving parts for circuit completion or interruption they are known in the art as static switches. Static switches may be provided with overcurrent-protective means to enable them to interrupt the flow of load current in response to a sensed overcurrent of a preselected magnitude.

As is well known, thyristors are semiconductor devices having a plurality of alternate layers of P-type and N-type semiconductor material which form a plurality of rectifying junctions therein. The alternate layers of P-type and N-type material are sandwiched between a pair of main electrodes (one electrode is known as the anode and the other electrode is known as the cathode). Thyristors additionally include some form of gating means, (e.g., a gate electrode) which is operative for initiating current conduction between the anode and cathode. When connected to a source of voltage and a load, a thyristor will ordinarily block appreciable current flow between its anode and cathode until triggered or fired by the gating means at a time when the anode is biased positive with respect to the cathode whereupon it abruptly switches to a relatively low-resistance conductive state. Once conducting, a thyristor will continue to conduct load current even if no further triggering is provided so long as the magnitude of current is above a predetermined holding level. When the magnitude of current drops below that level, the thyristor switches to a relatively high-impedance state whereupon the flow of load current is blocked until the thyristor is subsequently retriggered.

Static switches can be utilized in either DC or AC power systems. In an AC system, paired thyristors, such as SCR's, are normally connected in an inverse parallel configuration in order that both the positive and negative half cycles of applied voltage can be supplied to the load.

Although thyristors are solid-state devices, and thus are relatively reliable and long lived, nevertheless they may sometimes fail. When a thyristor fails it loses its current-blocking ability and hence acts as a short circuit. Therefore, the possibility exists that one or more failed thyristors in a static switch will permit the passage of current to the load at a time when the switch should be blocking such current. The overcurrent protective means that is normally provided cannot be relied on to detect this current, because the current magnitude will be lower than the preselected overcurrent trip level. The existence of any current in the load at a time when none is supposed to exist may be potentially unsafe and is always undesirable.

Further, if a switch thyristor has failed (shorted) the breaker will be ineffective to interrupt the flow of a fault current should a fault occur at a time when the switch is conducting.

Therefore, it is an object of my invention to provide a circuit for a static switch to isolate the power source from the load in the event that a thyristor in the static switch fails to block load current when it is supposed to.

SUMMARY OF THE INVENTION

A protective circuit is provided for a thyristor switch connected between a voltage source and a load in an electric power system. Conduction of the thyristor switch is controlled by a control circuit. The protective circuit is adapted to actuate (i.e., open) a normally closed auxiliary circuit breaker, connected in series with the static switch, if the static switch has lost its ability to block the flow of load current at a time when such blockage is required.

The protective circuit includes means for sensing if current is flowing through the thyristor switch and a logic circuit having one input supplied by the control circuit of the static switch and another input supplied by the current-sensing means. Upon the coincidence of a signal at the first input indicating that the switch should be blocking the flow of load current, and a signal at the other input indicating that load current is actually flowing, the logic circuit actuates the auxiliary circuit breaker to thereby automatically and rapidly interrupt the flow of load current.

DETAILED DESCRIPTION OF THE PREFERRED EMBODIMENT OF THE INVENTION

Figure 1:
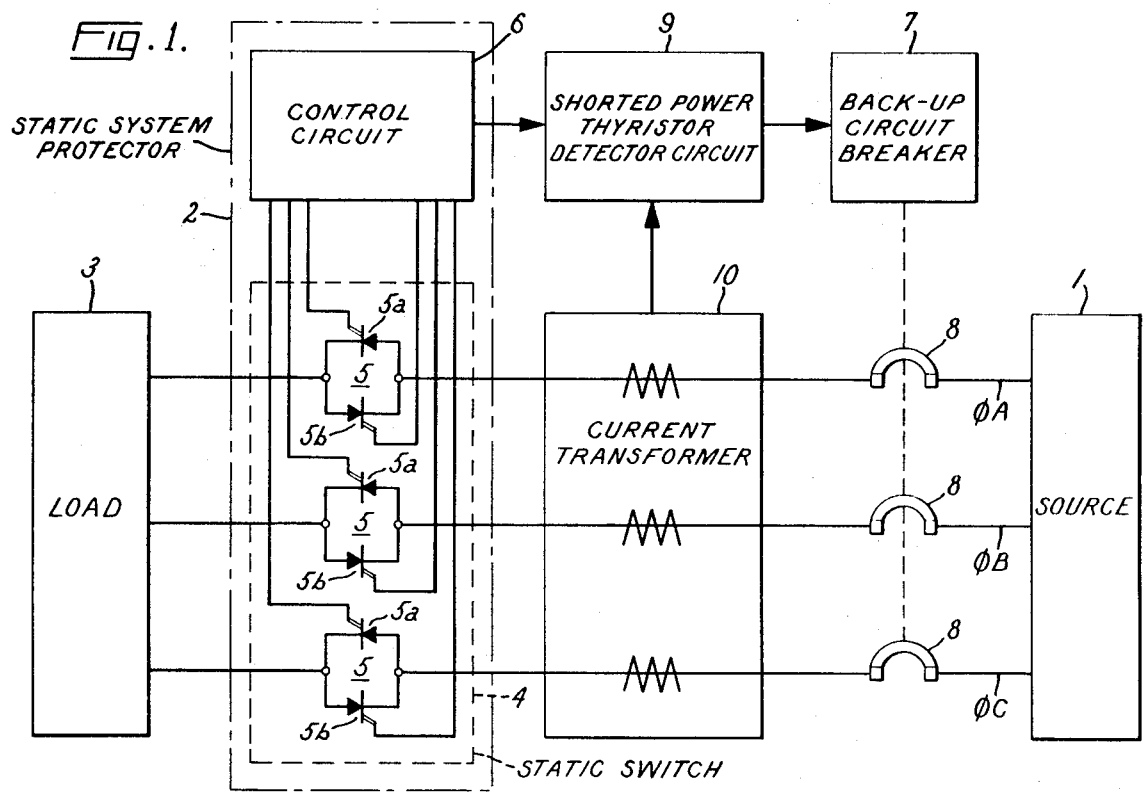
FIG. 1 is a function block diagram of my protective circuit utilized with a static switch in a power circuit.

As can be seen in FIG. 1 a three-phase alternating-voltage source 1 is arranged to supply power to load 3. In order to initiate or to terminate the flow of current to the load, a circuit breaker is provided between the source and the load. This circuit breaker is denoted as the Static System Protector 2 in that it includes a solid state or static switch 4.

In order to control conduction of the static switch, i.e., initiate or terminate current conduction therein, the Static System Protector also includes a control circuit 6 having two states or modes, namely "ON" and "OFF." The control circuit 6 is arranged to be actuated from its ON to its OFF states (thereby causing the static switch 4 to interrupt the flow of load current) either manually or by suitable automatic means which responds to a sensed fault. Further, the Static System Protector may include commutation means (not shown) to force commutate the static switch in high-speed response to actuation by the automatic fault sensing means.

The static switch 4 comprises one thyristor switch 5 for each phase of the power system. In order to provide for bidirectional load current conduction, each of the phase switches 5 is shown as comprising a pair of inverse parallel connected thyristor legs, namely 5a and 5b.

Thyristor legs 5a and 5b are shown as having a double gate electrode in order to symbolically represent that each leg may comprise a parallel array of similarly poled high-power thyristor elements. The number of thyristor elements utilized in each leg depends on the desired current handling capability of the switch. Of course it is to be understood that legs 5a and 5b may each comprise only a single thyristor element, if such is desired. To form a higher voltage switch, additional thyristors can be respectively connected in series with those shown, if desired.

Control circuit 6, in its "ON" mode, provides suitable gate signals to the thyristors making up switch 4 to render the switch conductive, whereupon load current is able to flow between the source 1 and the load 3. In its "OFF" mode no gate signals are provided by control circuit 6 to any of the switch thyristors. Hence, when control circuit 6 is in this mode the static switch 4 should block the flow of load current.

A current transformer 10 is provided to sense the magnitude of current through each of the phases of the switch. In accordance with my invention, a Shorted Power Thyristor Detector Circuit 9 is connected to the control circuit 6 and to the current transformer 10, and its output is coupled to a normally closed auxiliary switch or backup circuit breaker 7 whose main contacts 8 are connected in series with the thyristor switches 5 of the Static System Protector. The backup breaker 7 is arranged to open its contacts 8, thereby isolating the load 3 from the source 1, when actuated by the detector circuit 9 in response to a failure of the static switch 4 to block load current.

Figure 2:
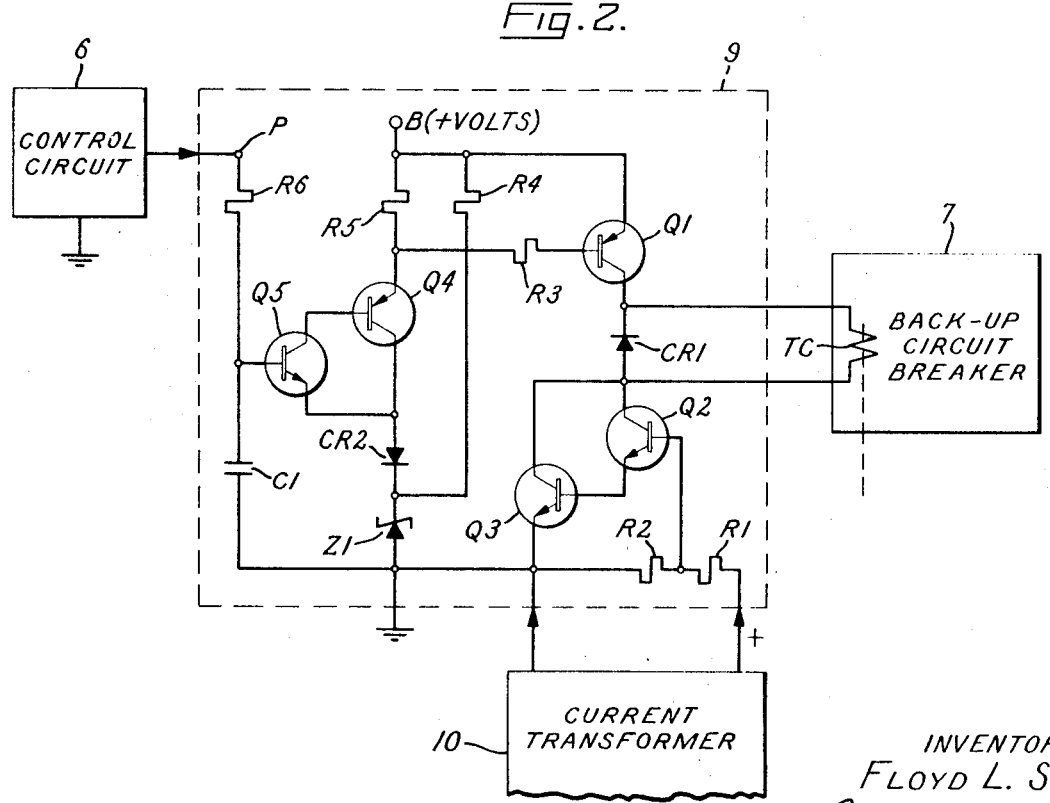
FIG. 2 is a schematic diagram of a portion of the configuration shown in FIG. 1.

FIG. 2 is a schematic drawing of a portion of the configuration shown in FIG. 1, with the presently preferred embodiment of my Shorted Power Thyristor Detector Circuit 9 shown in detail. As can be seen therein, resistors R1 and R2 form a voltage dividing network to properly bias the base of a transistor Q2. Current Transformer 10 is arranged to feed direct current to the R1–R2 voltage-dividing network when load current is flowing through the static switch. A semiconductor-switching element or transistor Q3 is connected in cascade with transistor Q2 (the emitter of Q2 is connected to the base or control electrode of Q3). The emitter of Q3 is connected to a common lead, shown as ground, of a control power source. The collectors of both transistors Q2 and Q3 are connected through a transient suppressing diode CR1 to the collector of transistor Q1. The collectors of transistors Q2 and Q3 are also connected to one side of a coil TC which is a trip coil for actuating the backup circuit breaker 7. The other side of coil TC is connected to the collector of semiconductor-switching element or transistor Q1. The emitter of transistor Q1 is connected to a terminal B of the control power source to provide a positive bias voltage thereto. The base or control electrode of transistor Q1 is connected through bias resistor R3 to the emitter of transistor Q4. The emitter of Q4 is connected to the point of positive bias voltage via bias resistor R5. The anode of an isolating diode CR2 is connected to the collector of transistor Q4 while its cathode is connected to the cathode of Zener diode Z1. The anode of diode CR2 is also connected to the emitter of transistor Q5. The anode of Zener diode Z1 is connected to ground. Resistor R4 is connected between the point of positive bias voltage and the anode of Zener diode Z1. Resistor R4 and zener diode Z1 establish a bias voltage for the emitter of transistor Q5 while diode CR2 insures that the reverse base-to-emitter voltage on transistor Q5 is not exceeded by the Zener voltage. The collector of transistor Q5 is connected to the base of transistor Q4. A capacitor C1 is connected between the base of transistor Q5 and ground and serves as a noise suppression filter for the incoming signal from point P. Resistor R6 is connected to the base of Q5 and limits the flow of current thereto when a positive input signal is applied at point P.

Transistors Q1 and Q3 form a two-input "AND" gate logic circuit for controlling the actuation (i.e., opening) of the backup or auxiliary circuit breaker 7 via its trip coil TC. The first input to the "And" gate is a signal indicative of the fact that the control circuit 6 of the static system protector is in its "OFF" mode (i.e., each thyristor switch is supposed to be blocking the flow of current therethrough). The first input signal results from a signal provided by control circuit 6 and is supplied to transistor Q1. The second input to the "AND" gate is a signal indicative of the fact that load current is actually flowing. The second input signal results from a signal provided by current transformer 10 and is supplied to transistor Q3.

Upon the coincidence of both said first and second input signals to the "AND" gate logic circuit, all three transistors Q1, Q2, and Q3 are contemporaneously on and the trip coil TC is energized by the positive bias supply B. This actuates the auxiliary switch 7, whereby load current is automatically interrupted by the opening of contacts 8.

The following is detailed explanation of the operation of my invention. A positive input signal is supplied to point P from the Static System Protector control circuit 6 whenever that circuit is in its "OFF" mode, i.e., when the switch thyristors 5 are supposed to be blocking the flow of load current. Whenever the signal at point P exceeds the bias voltage established by resistor R4 and Zener diode Z1, i.e., when the positive signal is supplied by control circuit 6, transistor Q5 begins conducting. Once transistor Q5 begins conducting cascaded transistor Q4 also begins conducting, whereupon transistor Q1, which is normally off, becomes forward biased and thus turns on. Once Q1 begins conducting the positive bias voltage form point B is supplied to one side of backup circuit breaker trip coil TC to prepare it for energization.

Whenever load current is flowing, current transformer 10 senses it and provides a DC signal indicative thereof. As previously noted load current may flow due to a shorted thyristor even when control 6 is in its "OFF" state. In the case of an ungrounded power system, if at least two similarly poled legs of two-phase switches lose their blocking ability, the resulting current flow between the shorted phases will be detected by the current transformer 10, which provides a positive voltage signal in response thereto. This signal is supplied as an input to the base of transistor Q2 via the voltage-dividing network of resistors R1 and R2 and enables Q2 to conduct. Transistor Q3 is rendered conductive in response to conduction in transistor Q2. Once transistor Q3 turns on coil TC will become energized by the current flowing in the path between the positive bias voltage point B and ground via conducting transistors Q1 and transistor Q3. Once energized coil TC causes the main contacts 8 of the normally closed backup circuit breaker 7 to open, whereupon all current flow through the static switch 4 is terminated.

A freewheeling diode CR1 is provided to suppress any transient voltage produced when the current in trip coil TC decays as the result of either or both of transistors Q1 and Q3 becoming non conductive.

While I have shown and described a particular embodiment of my invention, it will be obvious to those skilled in the art that various changes and modifications may be made without departing from my invention in its broader aspects; and I, therefore, intend herein to cover all such changes and modifications as fall within the true spirit and scope of my invention.

What I claim and desire to secure by Letters Patent of the United States is:

1. In a power system including a thyristor switch adapted to conduct load current between a voltage source and a load, a control circuit having first and second states, said control circuit in its first state being adapted to render said thyristor switch conductive and in its second state being unable to render said thyristor switch conductive, and a normally conductive auxiliary switch connected in series with said thyristor switch, the improvement comprising: means coupled to said control circuit and to said power system for actuating said auxiliary switch in response to the presence of load current in said power system when said control circuit is in said second state, whereby upon actuation of said auxiliary switch the flow of load current is interrupted.

2. In a power system including a thyristor switch adapted to conduct load current between a voltage source and a load, a control circuit adapted for providing an ON signal to said thyristor switch to render it conductive, and a normally conductive auxiliary switch connected in series with said thyristor switch, the improvement comprising means for actuating said auxiliary switch so as to interrupt the flow of load current in the event that said thyristor switch becomes conductive in the absence of an ON signal, said means comprising:
  a. current-sensing means; and
  b. an AND gate having one input coupled to said control circuit and a second input coupled to said current-sensing means, said AND gate actuating said auxiliary switch in response to the coincidence of:
    i. a first signal developed by said control means indicating that said thyristor switch should be blocking the flow of load current; and
    ii. a second signal developed by said current-sensing means indicating that load current is flowing.

3. In a power system including a thyristor switch adapted to conduct load current between a voltage source and a load, a control circuit adapted for providing an ON signal to said thyristor switch to render it conductive, and a normally conductive auxiliary switch including a coil for rendering said auxiliary switch nonconductive, said auxiliary switch being connected in series with said thyristor switch, the improvement comprising: means for energizing said coil to interrupt the flow of load current in the event that said thyristor switch becomes conductive in the absence of an ON signal, said means comprising:
a. current-sensing means;
b. a source of bias voltage; and
c. an AND gate coupled to said coil and said source of bias voltage, said AND gate comprising first and second semiconductor-switching elements having respective first and second control electrodes, said first control electrode coupled to said control circuit for receipt of a first signal indicating that said thyristor switch should be blocking the flow of current, and said second control electrode being coupled to said current-sensing means for receipt of a second signal indicating that load current is flowing, whereby said coil is energized by said bias source upon the coincident existence of said first and second signals.